(12) United States Patent
Lai et al.

(10) Patent No.: US 12,504,577 B2
(45) Date of Patent: Dec. 23, 2025

(54) BACKLIGHT MODULE, VIEWING MODE SWITCHING METHOD THEREOF, AND DISPLAY DEVICE INCLUDING THE BACKLIGHT MODULE

(71) Applicant: Radiant Opto-Electronics Corporation, Kaohsiung (TW)

(72) Inventors: Chun-Hau Lai, Kaohsiung (TW); Wei-Hsuan Chen, Kaohsiung (TW); Chun-Yi Wu, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 18/927,704

(22) Filed: Oct. 25, 2024

(65) Prior Publication Data

US 2025/0147223 A1    May 8, 2025

(30) Foreign Application Priority Data

Nov. 3, 2023   (CN) .......................... 202311458353.1

(51) Int. Cl.
*F21V 8/00*        (2006.01)

(52) U.S. Cl.
CPC ......... *G02B 6/0068* (2013.01); *G02B 6/0053* (2013.01); *G02B 6/0055* (2013.01); *G02B 6/0076* (2013.01)

(58) Field of Classification Search
CPC . B60Y 2400/92; G02B 6/0076; G02F 1/1323; G02F 1/133607; G06F 3/013
See application file for complete search history.

(56) References Cited

U.S. PATENT DOCUMENTS

| | | | |
|---|---|---|---|
| 12,313,872 B2 * | 5/2025 | Fattal | G02F 1/133615 |
| 2014/0111741 A1 | 4/2014 | Han et al. | |
| 2020/0005718 A1 * | 1/2020 | Fattal | G02B 6/0076 |
| 2021/0390914 A1 * | 12/2021 | Fattal | G02F 1/133626 |

(Continued)

FOREIGN PATENT DOCUMENTS

| | | |
|---|---|---|
| EP | 4160086 A1 | 4/2023 |
| JP | 2007234430 A | 9/2007 |

(Continued)

OTHER PUBLICATIONS

Written Opinion or related European application (Year: 2025).*

*Primary Examiner* — Keith G. Delahoussaye

(57) ABSTRACT

A backlight module has a first side viewing angle luminance LAS1 and a first normal viewing angle luminance LAN1 in the side viewing mode, wherein LAS1/LAN1>50%. The backlight module has a second side viewing angle luminance LAS2 and a second normal viewing angle luminance LAN2 in the narrow viewing mode, wherein LAS2/LAN2<0.5%. The first side angle and the second side angle occur in a slanting direction. The first normal view and the second normal view occur in a normal direction. When executing a side viewing execution step, an upper backlight unit and a lower backlight unit are activated to form the side viewing mode. When executing a narrow viewing execution step, the upper backlight unit is turned off and the lower backlight unit is activated to form the narrow viewing mode. The invention also provides a display device including the backlight module.

20 Claims, 8 Drawing Sheets

(56) References Cited

U.S. PATENT DOCUMENTS

| | | | | |
|---|---|---|---|---|
| 2023/0101373 A1* | 3/2023 | Kim | ..................... | G02B 6/0036 |
| | | | | 362/613 |
| 2023/0288753 A1* | 9/2023 | Shiau | ................ | G02F 1/133615 |
| 2024/0257775 A1* | 8/2024 | Masuda | ............ | G02F 1/134372 |

FOREIGN PATENT DOCUMENTS

| | | |
|---|---|---|
| KR | 1020160022211 A | 2/2016 |
| WO | 2011067911 A1 | 6/2011 |

\* cited by examiner

BACKLIGHT MODULE, VIEWING MODE SWITCHING METHOD THEREOF, AND DISPLAY DEVICE INCLUDING THE BACKLIGHT MODULE

RELATED APPLICATIONS

This application claims priority of China Application No. 202311458353.1, filed on Nov. 3, 2023. The entire disclosure of the above application is hereby incorporated by reference.

FIELD OF THE INVENTION

The present invention relates to an optical device, particularly to a backlight module and a display device capable of generating various viewing angle modes.

BACKGROUND OF THE INVENTION

With the advancement of technology, electronic devices equipped with liquid crystal displays have become indispensable items in modern life. However, users have different requirements for the viewing angles of display devices in various situations. For example, when users want to share information on the screen with others, the display device needs to have a wide viewing angle so that multiple people can see the contents on the screen from different angles, which is referred to as the sharing mode. On the other hand, when handling personal affairs and desiring privacy, users want the displayed screen to be visible only to themselves. In this case, the display device needs to have a narrow viewing angle function, which is referred to as the privacy mode.

As the number of in-vehicle displays increases, it is essential for displays other than the dashboard to be able to switch viewing angles to prevent driver distraction and ensure driving safety. Traditionally, if a display requires privacy, the simplest approach is to add a privacy filter on the outermost layer. However, a significant drawback of this method is that it often noticeably reduces brightness. Alternatively, controlling different viewing angles through the display panel itself requires an active, dedicated display panel for each viewing angle mode, which can result in higher manufacturing costs.

Especially for displays positioned in front of the passenger seat in vehicles, it is necessary to have a narrow viewing angle function to prevent the screen's glare from affecting the driver or reflecting onto the car window. However, there are times when it is necessary to share information with the driver without causing light reflection on the car window. Thus, a biased viewing angle function that is biased to one side is needed.

SUMMARY OF THE INVENTION

One object of the present invention is to provide a backlight module capable of switching between narrow viewing mode and side viewing mode.

The backlight module capable of switching between a side viewing mode and a narrow viewing mode, wherein in the side viewing mode, the backlight module has a first side luminance LAS1 and a first normal luminance LAN1, wherein LAS1/LAN1>50%, and in the narrow viewing mode, the backlight module has a second side luminance LAS2 and a second normal luminance LAN2, wherein LAS2/LAN2<0.5%. The first side angle and second side angle are in a slanting direction, and the first normal angle and second normal are in a normal direction.

In a preferable embodiment, the backlight module comprises an upper backlight unit and a lower backlight unit located beneath the upper backlight unit. The upper backlight unit comprises an upper light source and an upper light guide plate for receiving light emitted from the upper light source. The upper light guide plate having at least one first side edge and at least one second side edge. The first side edge is substantially parallel to a first axis, the second side edge is substantially parallel to a second axis, and the second axis is non-parallel to the first axis. The first axis being between +90° and −90°, and the upper light source is positioned adjacent to one side of the first axis near +90° and extends along the second axis.

In a preferable embodiment, the upper light guide plate is substantially rectangular, the first side edge being one of the longer sides of the rectangle, the second side edge being one of the shorter sides of the rectangle, and wherein the upper light source is adjacent to the shorter side.

In a preferable embodiment, the upper light guide plate comprises a light emitting surface, a reflective surface, and a plurality of dot structures formed on the reflective surface. The light emitting surface being on a plane defined by the intersection of the first axis and the second axis, the light emitting surface and the reflective surface being on opposite sides of the upper light guide plate. Each dot structure comprising a central region and an outer ring region surrounding the central region, wherein the height H of the central region is greater than 1 μm, and the diameter ø of the outer ring region is greater than 2H.

In a preferable embodiment, the height H of the central region of each dot structure is between 3 μm and 7 μm, inclusive of endpoint values, and the diameter ø of the outer ring region is between 15 μm and 35 μm, inclusive of endpoint values.

In a preferable embodiment, the central region of each dot structure is concave relative to the reflective surface, and the outer ring region is annular and convex relative to the reflective surface.

In a preferable embodiment, the central region of each dot structure is protruding relative to the reflective surface, and the outer ring region is a recessed groove relative to the reflective surface.

In a preferable embodiment, the backlight module further comprises an upper light control film positioned on the light emitting side of the upper backlight unit, configured to collimate light emitted from the backlight module along the second axis to a normal viewing angle.

In a preferable embodiment, the backlight module further comprises at least one lower light control film positioned between the upper backlight unit and the lower backlight unit. The upper light control film and the lower light control film control light in different directions, and the lower light control film is configured to collimate light emitted from the backlight module along the first axis to a normal viewing angle.

In a preferable embodiment, the backlight module further comprising two prism sheets positioned between the upper backlight unit and the lower backlight unit. Each prism sheet having a plurality of parallel stripe microstructures facing the upper backlight unit. The extension directions of the stripe microstructures of the two prism sheets are perpendicular to each other.

In a preferable embodiment, the lower backlight unit comprises a lower light source, a lower light guide plate that receives light from the lower light source, and at least one optical film located on an emission side of the lower light guide plate. The lower light guide plate has an incident side connected to the emission side, the incident side receives light emitted from the lower light source, and the lower light source is arranged along the first axis.

In a preferable embodiment, the lower backlight unit comprises a lower light source, a diffuser plate that receives light from said lower light source, and at least one optical film located on an emission side of the diffuser plate. The diffuser plate has an incident side opposite to the emission side, and wherein the incident side receives light emitted from the lower light source.

In a preferable embodiment, the normal direction is substantially at 0° viewing angle position relative to the first axis, and the slanting direction is substantially at −45° viewing angle position relative to the first axis.

Another object of the present invention is to provide a viewing mode switching method of the backlight module as described above. The method comprises a side viewing angle execution step and a narrow viewing angle execution step. When executing the side viewing angle execution step, both the upper backlight unit and the lower backlight unit are turned on to switch to the side viewing mode, when executing the narrow viewing angle execution step, the upper backlight unit is turned off, and the lower backlight unit is turned on to switch to the narrow viewing mode.

In a preferable embodiment, the backlight module is applied to an in-vehicle display, the viewing mode switching method further comprising a sensing step to determine whether to execute the side viewing angle execution step or the narrow viewing angle execution step based on vehicle speed or driver's eye gaze tracking.

Another object of the present invention is to provide a display device.

The display device includes the backlight module as described above, and a display panel arranged on the backlight module.

According to the structural design of the light incident microstructures of the optical film, the light field of the light source can be expanded to achieve the purpose of emitting light at a specific angle.

The effectiveness of the present invention lies in its application to an in-vehicle display set at the passenger seat, where in the narrow viewing angle mode, $LAS2/LAN2<0.5\%$, reducing lateral luminance to below 0.5% of the second normal luminance LAN2, thereby concentrating luminance towards the normal viewing angle direction. This mode is exclusively for the passenger to view, preventing lateral glare that could affect the driver, achieving the effect of a narrow viewing angle. In the side viewing angle mode, $LAS1/LAN1>50\%$, ensuring that the luminance required for lateral viewing angle is at least 50% relative to the first normal luminance LAN1. This mode allows both the driver and the passenger to view simultaneously, with sufficient brightness for the driver to see clearly, achieving the effect of a side viewing angle.

DETAILED DESCRIPTION OF THE INVENTION

The detailed description and preferred embodiments of the invention will be set forth in the following content and provided for people skilled in the art to understand the characteristics of the invention.

The words "approximately", "approximately", "approximately" or "substantially" appearing in the content of this case not only cover the clearly stated numerical values and numerical ranges, but also covers the allowable deviation range that can be understood by a person with ordinary knowledge in the technical field to which the invention belongs. The deviation range can be determined by the error generated during measurement, and this error is caused, for example, by limitations of the measurement system or process conditions. In addition, "about" may mean within one or more standard deviations of the above numerical value, such as within +10%, +5%, +3%, +2%, +1%, or +0.5%. Words such as "about", "approximately" or "substantially" appearing in this text may be used to select acceptable deviation ranges or standard deviations based on optical properties, etching properties, mechanical properties, or other properties. Therefore, a single standard deviation is not applied to all the above optical properties, etching properties, mechanical properties, and other properties.

The backlight module of the present invention capable of switching between a side viewing mode and a narrow viewing mode, wherein in the side viewing mode, the backlight module has a first side luminance LAS1 and a first normal luminance LAN1, wherein $LAS1/LAN1>50\%$, and in the narrow viewing mode, the backlight module has a second side luminance LAS2 and a second normal luminance LAN2, wherein $LAS2/LAN2<0.5\%$. The first side angle and second side angle are in a slanting direction, and the first normal angle and second normal are in a normal direction. When the present invention is applied to an in-vehicle display set at the passenger seat, where in the narrow viewing angle mode, $LAS2/LAN2<0.5\%$, reducing lateral luminance to below 0.5% of the second normal luminance LAN2, thereby concentrating luminance towards the normal viewing angle direction. This mode is exclusively for the passenger to view, preventing lateral glare that could affect the driver, achieving the effect of a narrow viewing angle. In the side viewing angle mode, $LAS1/LAN1>50\%$, ensuring that the luminance required for lateral viewing angle is at least 50% relative to the first normal luminance LAN1. This mode allows both the driver and the passenger to view simultaneously, with sufficient brightness for the driver to see clearly, achieving the effect of a side viewing angle.

Figure 1:
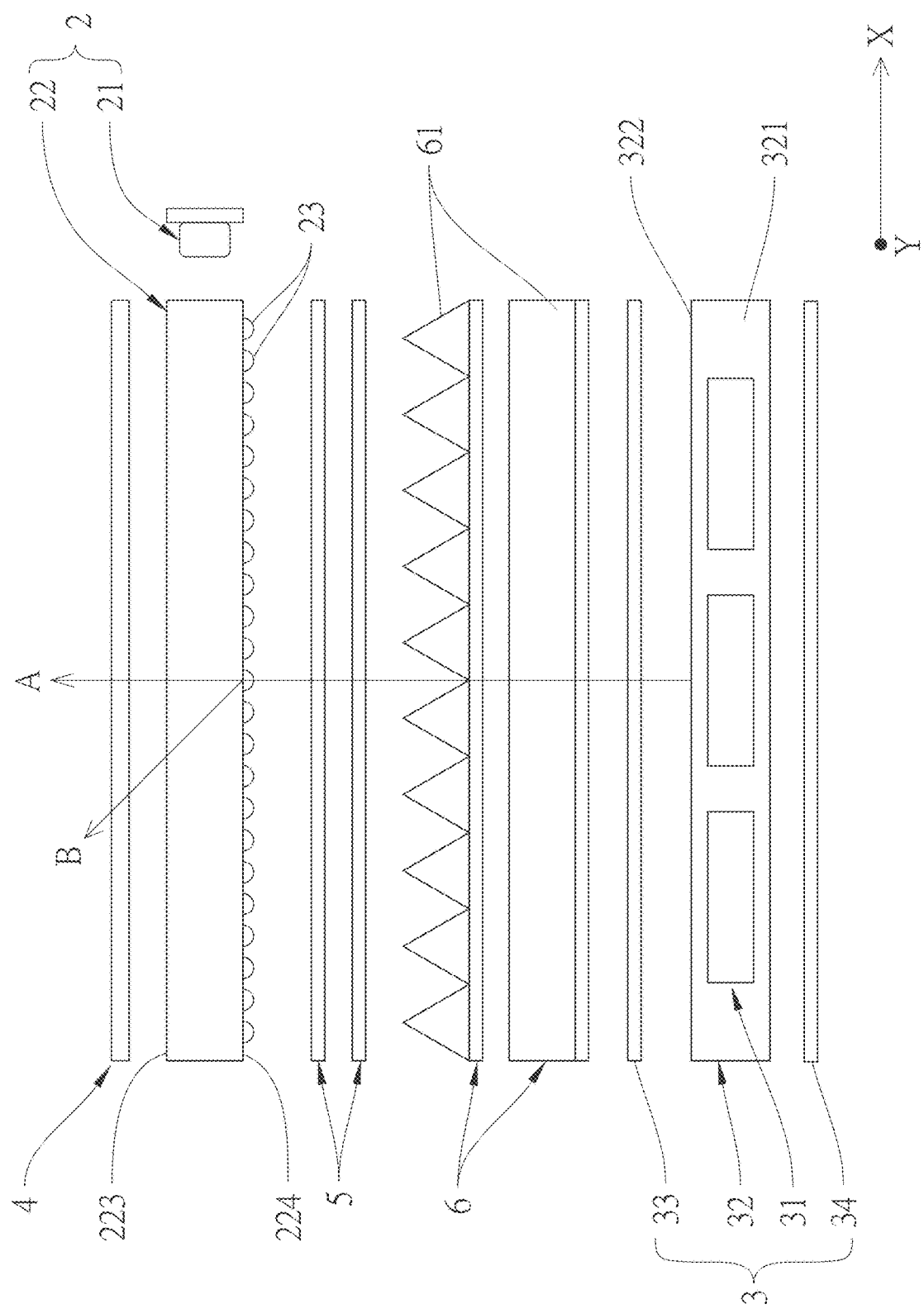
FIG. 1 is a side view diagram illustrating a preferred embodiment of the backlight module of the present invention, wherein both an upper light source and a lower light source are side-lit light sources.

Referring to FIG. 1, it is a preferred embodiment of the backlight module of the present invention. The backlight module comprises an upper backlight unit 2 and a lower backlight unit 3 located beneath the upper backlight unit 2. The upper backlight unit 2 includes an upper light source 21 and an upper light guide plate 22 that receives light emitted by the upper light source 21.

Figure 2:
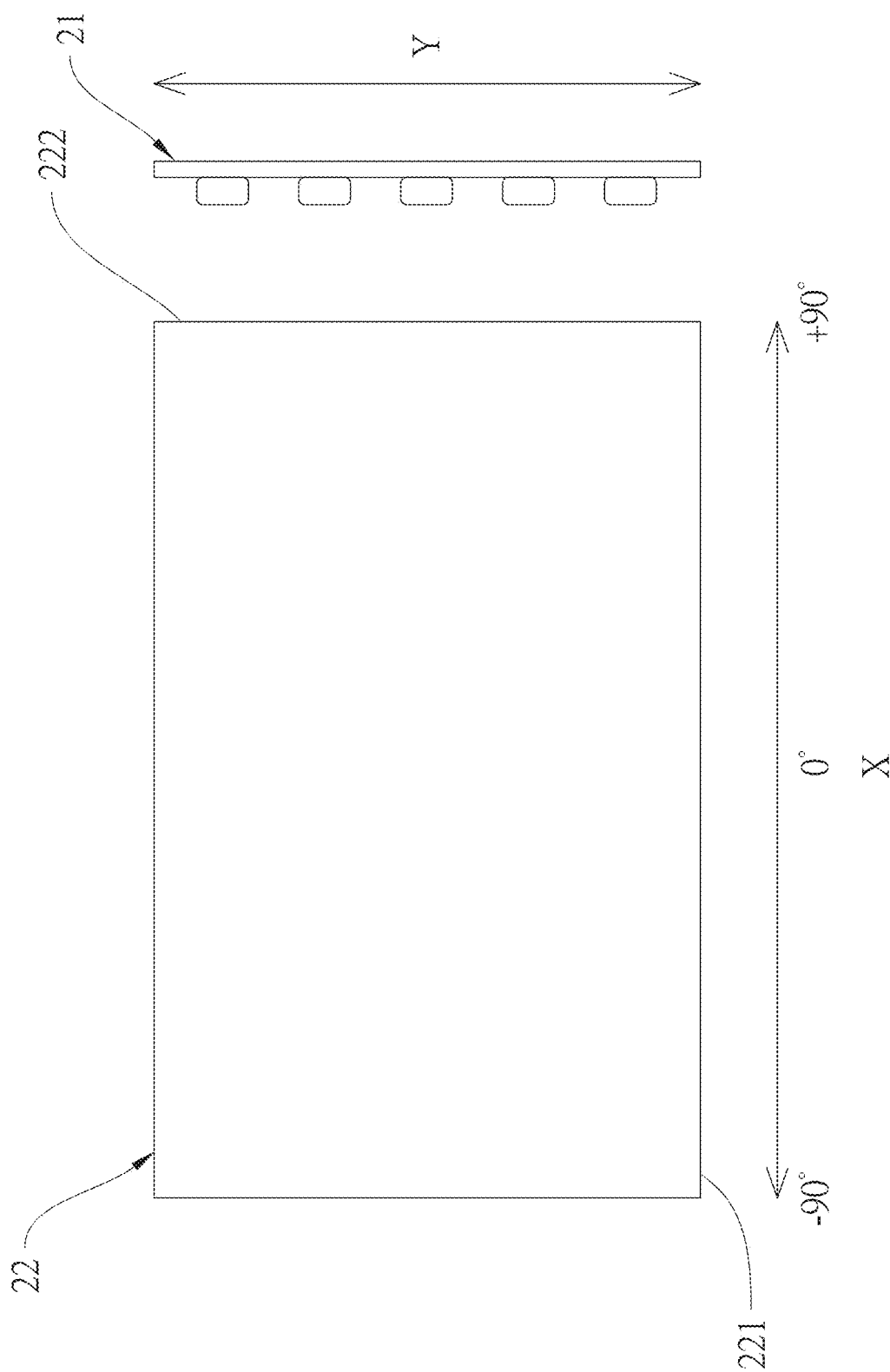
FIG. 2 is a top view diagram illustrating the configuration of an upper light guide plate.

Referring to FIG. 2, the upper light guide plate 22 has at least one first side edge 221 and at least one second side edge 222. The first side edge 221 is substantially parallel to a first axis X, and the second side edge 222 is substantially parallel to a second axis Y, where the second axis Y is non-parallel to the first axis X. The first axis X is between +90° and −90°. The upper light source 21 is positioned on the first axis X adjacent to the side of +90° and extends along the second axis Y.

As shown in FIG. 1, the upper light guide plate 22 includes a light emitting surface 223, a reflective surface 224, and a plurality of dot structures 23 formed on the reflective surface 224. The dot structures 23 are designed to breach the rule of total internal reflection, allowing light to uniformly transmit through the light emitting surface 223 of the upper light guide plate 22. The light emitting surface 223 and the reflective surface 224 are located on opposite sides of the upper light guide plate 22. The light emitting surface 223 lies on a plane defined by the intersection of the first axis X and the second axis Y. In this embodiment, for a rectangular display where the longer side is horizontal, the upper light guide plate 22 takes on a rectangular shape. The first side edge 221 corresponds to one of the longer sides of this rectangle, while the second side edge 222 corresponds to one of the shorter sides. The upper light source 21 is positioned adjacent to the second side edge 222, with the first axis X representing the horizontal direction of the longer side and the second axis Y representing the vertical direction of the shorter side. Alternatively, the upper light source 21 can be placed on the side adjacent to +90° on the first axis X, or on the right side in the horizontal direction of the longer side, extending along the second axis Y, which is the vertical direction of the shorter side. Consequently, light emitted by the upper light source 21 travels towards the left side in the horizontal direction of the longer side and emits through the light emitting surface 223 of the upper light guide plate 22.

In this embodiment, since there are no additional prisms above the light emitting surface 223 of the upper light guide plate 22 to change the direction of light propagation, the light continues to emit towards the left side in the horizontal direction of the longer side without reversing. It exits the light emitting surface 223 of the upper light guide plate 22 at a negative slope angle between 0° and −90°. This configuration ensures that in the side viewing mode, the luminance required for lateral viewing angle remains at least 50% relative to the maximum luminance at the normal viewing angle, achieving the effect of a side viewing angle.

Compared to the prior art where the upper light source is positioned on one side along the second axis and extends along the longer side horizontally, resulting in a light field distribution that spreads out rather than focusing on the first axis, the light cannot be concentrated towards the side viewing angle, and the luminance in the side viewing angle relative to the maximum luminance at the normal viewing angle would not meet the minimum requirement of 50%.

Figure 3:
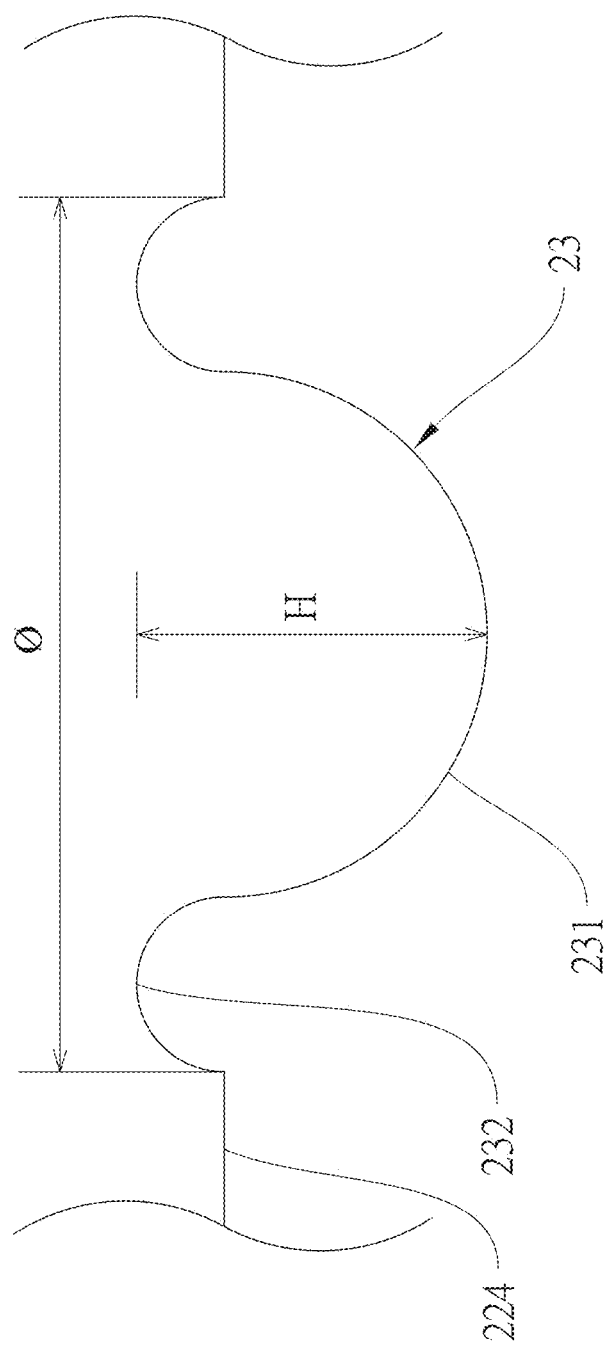
FIG. 3 is a side view diagram illustrating a dot structure in a partially enlarged manner.
Figure 4:
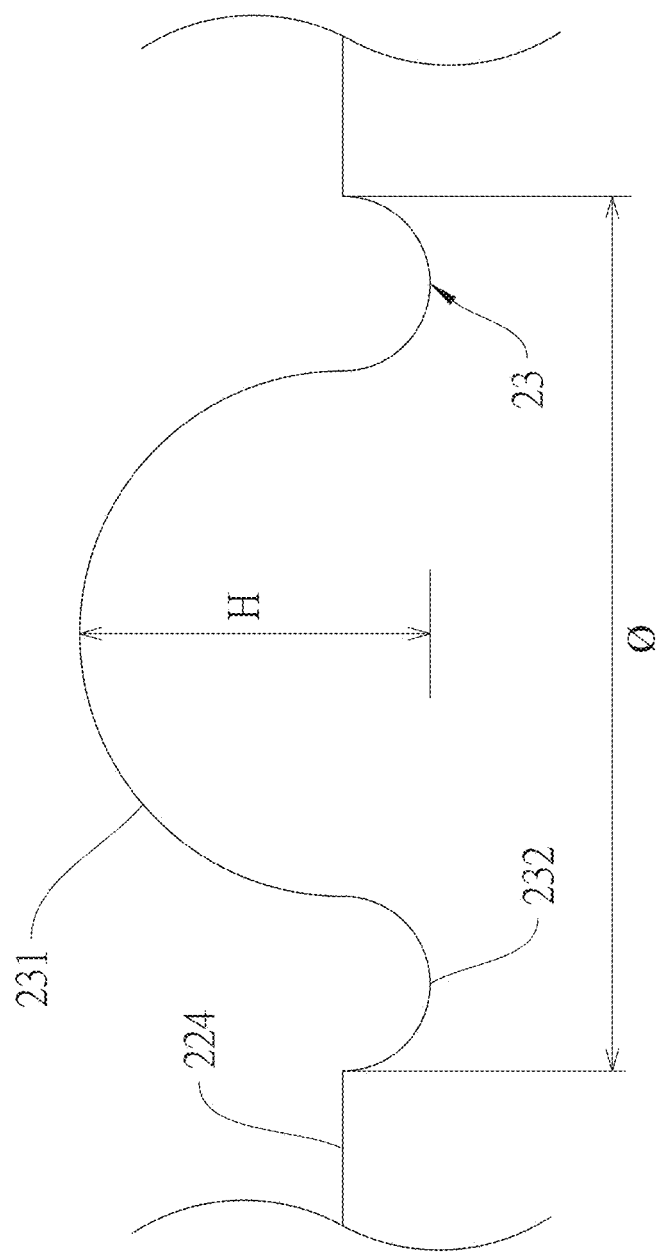
FIG. 4 is a side view diagram illustrating another form of the dot structure.

Referring to FIG. 3, each dot structure 23 on the upper light guide plate 22 includes a central region 231 and an outer ring region 232 surrounding the central region 231. The height H of the central region 231 is greater than 1 µm, and the diameter ø of the outer ring region 232 is greater than 2H. In this embodiment, each dot structure 23 can be as shown in FIG. 3, where the central region 231 protrudes relative to the reflective surface 224, and the outer ring region 232 forms a recessed groove relative to the reflective surface 224. In other embodiments, each dot structure 23 can also be as shown in FIG. 4, where the central region 231 is concave relative to the reflective surface 224, and the outer ring region 232 is annular and convex relative to the reflective surface 224. By this design, each dot structure 23 exhibits a low-height arcuate protrusion (as shown in FIG. 3) or a shallow-depth arcuate recess (as shown in FIG. 4), rather than a taller hemispherical protrusion or deeper hemispherical recess. This not only achieves the basic effects in both narrow viewing mode and side viewing mode but also improves the efficiency and ease of laser processing on molds. In order to enhance the luminance required for side viewing angles, reduce energy consumption, and improve front-of-screen (FOS) display quality, this embodiment can increase the height of each dot structure 23 as depicted in FIG. 3 (or deepen each recess as shown in FIG. 4). Specifically, the height H of the central region 231 of each dot structure 23 ranges from 3 to 7 µm, including endpoint values. The diameter ø of the outer ring region 232 ranges from 15 to 35 µm, including endpoint values.

Referring to FIG. 1, the backlight module further includes an upper light control film 4 positioned on the emission side of the upper backlight unit 2, two lower light control films 5 positioned between the upper backlight unit 2 and the lower backlight unit 3, and two prism sheets 6 positioned between the upper backlight unit 2 and the lower backlight unit 3. The upper light control film 4 and the lower light control films 5 are used to control light from different directions. The upper light control film 4 is used to focus the light output along the second axis Y of the backlight module to the normal viewing angle. This is particularly useful in automotive applications such as Center Information Displays (CID) or Passenger Information Displays (PID) mounted on the dashboard or in front of the passenger seat. By converging the vertical light direction towards the center, it prevents light from being reflected by the windshield. As for the lower light control films 5, they are used to focus the light output along the first axis X of the backlight module to the normal viewing angle. This helps converge the light distribution generated by the lower backlight unit 3 from the left and right horizontal directions towards the center. This enhancement strengthens the narrow viewing angle effect by preventing overly dispersed light from passing through the upper backlight unit 2 and affecting the basic effects of narrow viewing mode and side viewing mode.

Furthermore, each prism sheet 6 includes multiple parallel stripe microstructures 61 facing the upper backlight unit 2. The extension direction of the stripe microstructures 61 of one prism sheet 6 are perpendicular to that of another prism 6. The prisms 6 directly face the upper light guide plate 22 of the upper backlight unit 2, without any opaque components blocking the light path between them. As a result, light emitted from the lower backlight unit 3 can pass through the lower light control films 5 and the prism sheets 6 directly into the upper backlight unit 2, without obstruction from opaque components that would reduce light transmission or cause significant light reflection back to the lower backlight unit 3. This setup helps to enhance the luminance output in narrow viewing mode and side viewing mode.

Figure 5:
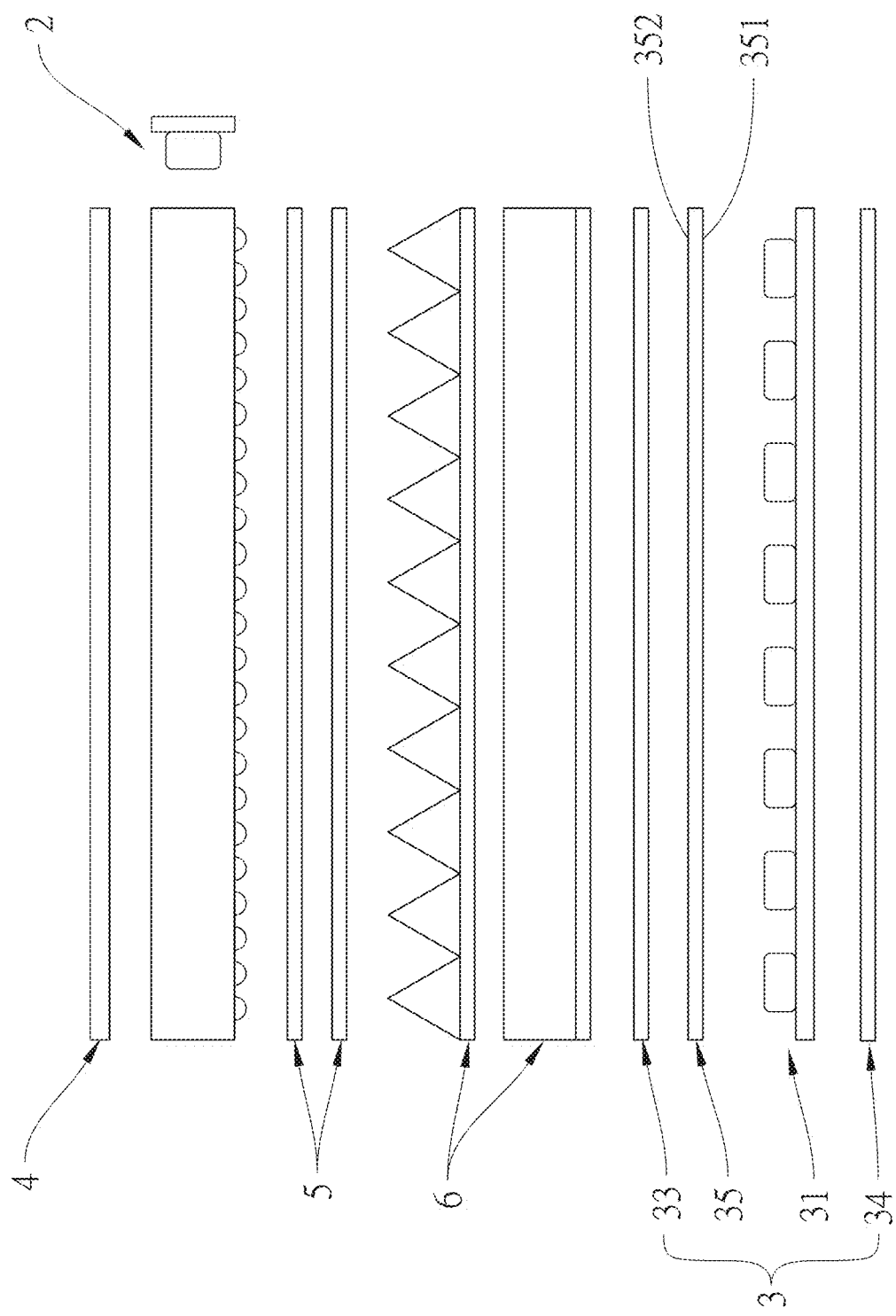
FIG. 5 is a side view diagram illustrating another form of the preferred embodiment, wherein the upper light source is a side-lit light source and the lower light source is a direct-lit light source.
Figure 6:
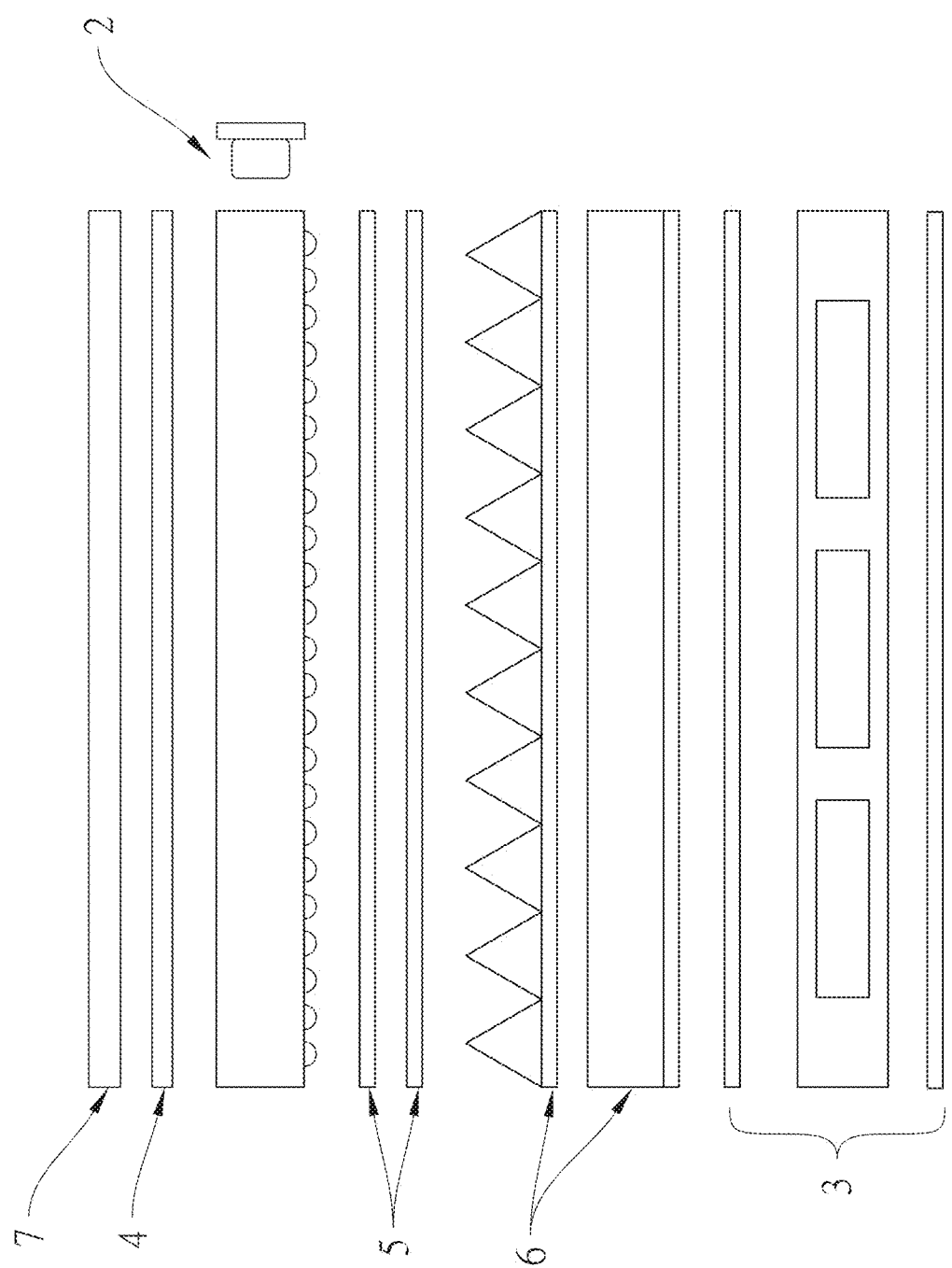
FIG. 6 is a side view diagram illustrating a preferred embodiment of the display device of this present invention.

As for the lower backlight unit 3, there are no restrictions on its style or the placement of light sources. In this embodiment, as shown in FIG. 1, the lower backlight unit 3 is a side-lit light source and comprising a lower light source 31, a lower light guide plate 32 that receives light from the lower light source 31, at least one optical film 33 located on an emission side 322 of the lower light guide plate 32, and a reflector 34. The lower light guide plate 32 has an incident side 321 connected to the emission side 322. The incident side 321 receives light emitted by the lower light source 31, which is oriented along the first axis X. In some embodiments, the lower backlight unit 3 can also be a direct-lit light source as shown in FIG. 5, and includes a lower light source 31, a diffuser plate 35 that receives light from the lower light source 31, at least one optical film 33 located on an emission side 352 of the diffuser plate 35, and a reflector 34. The diffuser plate 35 has an incident side 351 opposite to the emission side 352, where the incident side 351 receives light emitted by the lower light source 31. Referring to FIG. 6, a display panel 7 is mounted on the backlight module described above, which constitutes the display device of the present invention. FIG. 6 illustrates this with the backlight module shown in FIG. 1 as an example. In some embodiments, the display panel 7 is mounted on the backlight module shown in FIG. 5.

The present invention further provides a viewing mode switching method for switching the viewing angle of the backlight module as described above. The method comprises a side viewing angle execution step and a narrow viewing angle execution step. When executing the side viewing angle execution step, both the upper backlight unit 2 and the lower backlight unit 3 are turned on to switch to the side viewing mode, when executing the narrow viewing angle execution step, the upper backlight unit 2 is turned off, and the lower backlight unit 3 is turned on to switch to the narrow viewing mode.

The backlight module of the present invention capable of switching between a side viewing mode and a narrow viewing mode, wherein in the side viewing mode, the backlight module has a first side luminance LAS1 and a first normal luminance LAN1, wherein LAS1/LAN1>50%, and in the narrow viewing mode, the backlight module has a second side luminance LAS2 and a second normal luminance LAN2, wherein LAS2/LAN2<0.5%. The first side angle and second side angle are in a slanting direction, and the first normal angle and second normal are in a normal direction. Referring to FIG. 2, the normal direction is at a viewing angle position of approximately 0° along the first axis X, while the slanting direction is at a viewing angle position of approximately-45° along the first axis X. For example, when the backlight module is applied to an in-vehicle display and is positioned directly in front of the passenger seat, the normal direction (0° viewing angle) corresponds to the passenger seat position, while the slanting direction (−45° viewing angle) corresponds to the driver's seat position. Additionally, as shown in FIG. 1, the upper light source 21 must be positioned at the short side of the upper light guide plate 22, away from the driver's seat, so that the light emitted from the upper light source 21 is projected towards the driver's seat.

As previously described, in the narrow viewing mode, the upper backlight unit 2 is turned off while the lower backlight unit 3 is turned on. At this time, the relationship between the second side luminance LAS2 and the second normal luminance LAN2 is represented by LAS2/LAN2<0.5%. In other words, the second side luminance (LAS2) is significantly reduced to avoid interference with the driver's view. More specifically, when the lower backlight unit 3 is turned on, the incident side 321 of the lower light guide plate 32 receives light emitted from the lower light source 31 and emits it through the emission side 322. The lower light control films 5 are designed to collimate the light emitted along the first axis X towards the direct viewing angle (i.e., to concentrate the light from the left and right sides to the central position), thereby emitting light in a direction close to the normal direction and providing sufficiently strong collimated light at the 0-degree viewing angle position, as indicated by arrow A in FIG. 1. Thus, in the narrow viewing mode, it is possible to prevent individuals on the left and right sides from viewing the content displayed on the screen, providing a privacy protection effect. When applied to in-vehicle devices other than the instrument panel (e.g., screens positioned in front of the passenger seat), switching to the narrow viewing mode can help prevent driver distraction by the screen, thereby enhancing driving safety.

In the narrow viewing mode, both the upper backlight unit 2 and the lower backlight unit 3 are turned on. At this time, the relationship between the first side luminance LAS1 and the first normal luminance LAN1 is represented by LAS1/LAN1>50%. Therefore, the side viewing mode provides sufficient luminance (LAS1) in the slanting direction for the primary driver to view. More specifically, when both the upper backlight unit 2 and the lower backlight unit 3 are turned on, the light from the lower backlight unit 3 is converged by the prism sheets 6 and the lower light control films 5 before directly entering the upper backlight unit 2. Since the upper light source 21 of the upper backlight unit 2 is positioned at the short side of the upper light guide plate 22, which is away from the driver's seat, the light from the upper light source 21 is projected towards the driver's seat direction. When both the upper backlight unit 2 and the lower backlight unit 3 are turned on, as shown in FIG. 1, in addition to providing sufficient intensity of collimated light at the 0-degree viewing angle (indicated by arrow A), sufficient light intensity is also provided at the −45-degree viewing angle (indicated by arrow B). This allows both the front passenger and the primary driver to view the screen simultaneously. The upper light control film 4, positioned in the light exit direction of the upper backlight unit 2, is designed to collimate the light emitted from the backlight module along the second axial direction Y to the direct viewing angle, thereby preventing light from reflecting off the windshield.

Figure 7:
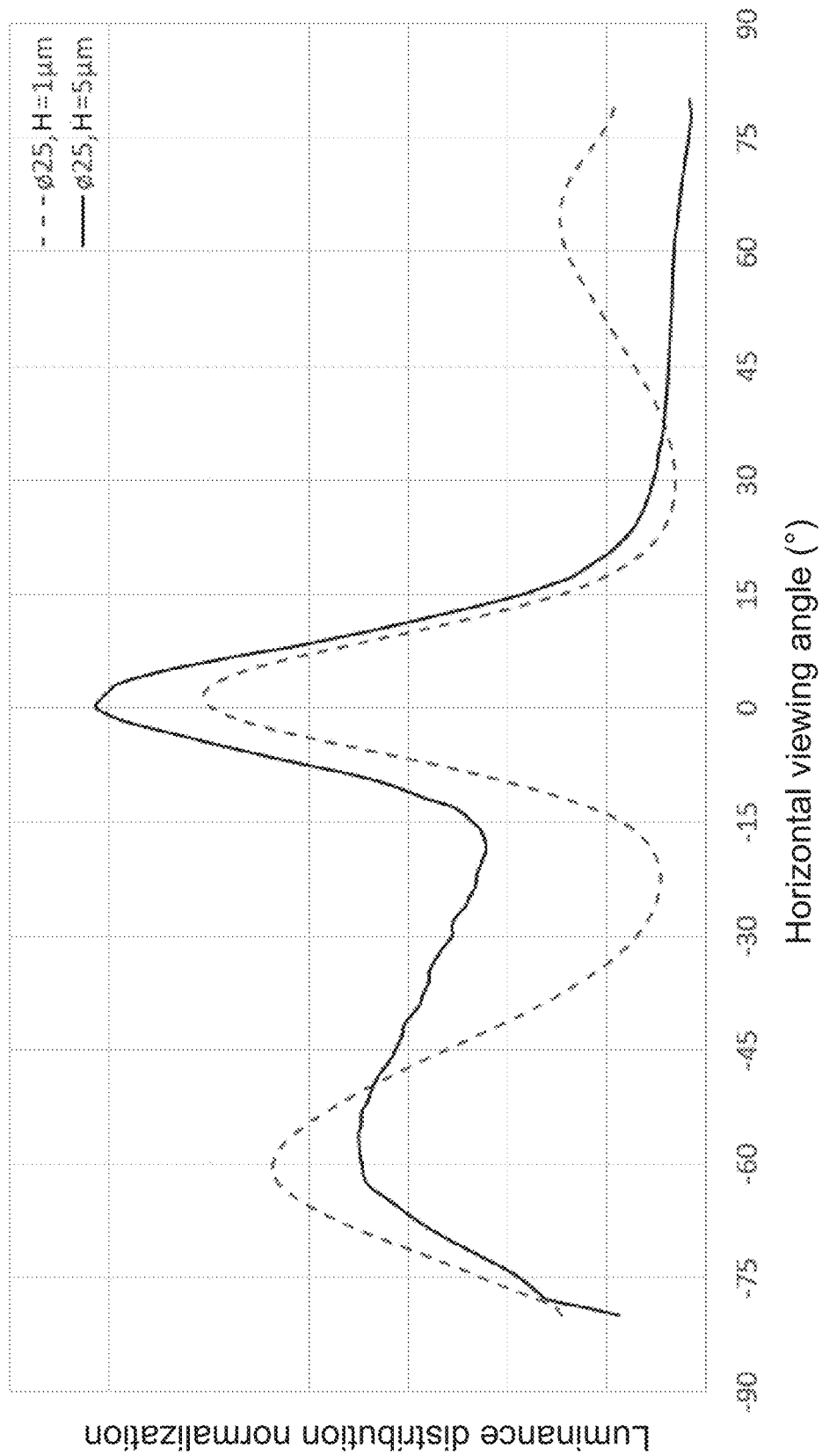
FIG. 7 is a curve diagram illustrating the luminance distribution in a side viewing mode.
Figure 8:
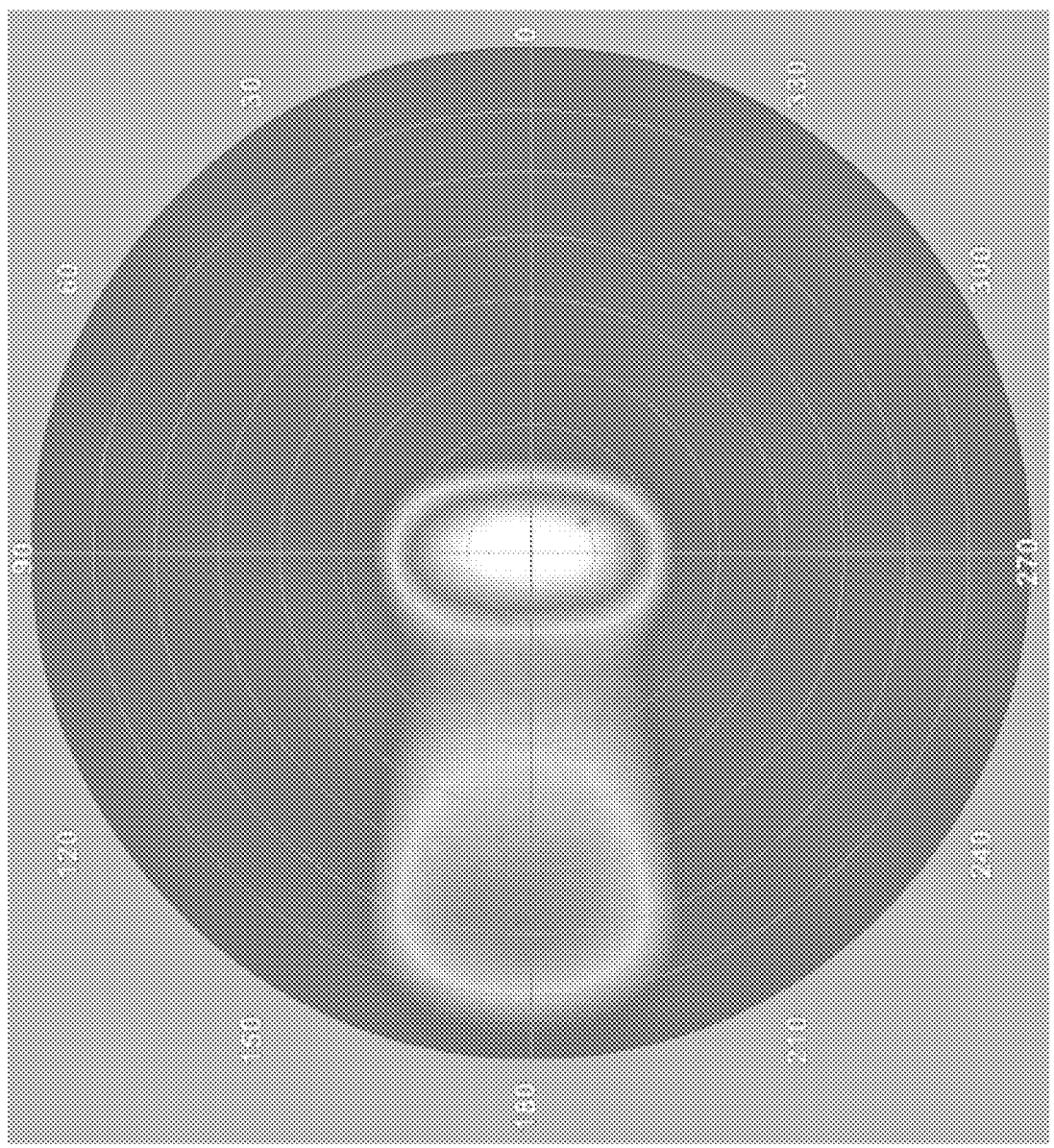
FIG. 8 is a simulated energy distribution diagram, illustrating the energy of light and the deflection of the viewing angle in the side viewing mode.

Referring to FIG. 7, it illustrates the horizontal luminance distribution in the side viewing mode, compared using dot structures 23 of different sizes. The dashed line represents a dot structure 23 where the height H of the central region 231 is 1 μm and the diameter ø of the outer ring region 232 is 25 μm. The solid line represents a dot structure 23 where the height H of the central region 231 is 5 μm and the diameter ø of the outer ring region 232 is 25 μm. As shown in FIG. 7, compared to the case where the height H of the central region 231 of each dot structure 23 is 1 μm, when the height H of the central region 231 is 5 μm, both the first normal luminance LAN1 in the normal direction (0° viewing angle) and the first side luminance LAS1 in the slanting direction (−45° viewing angle) are increased. This means that both the front passenger and the primary driver can view the screen simultaneously. Additionally, the luminance of light distribution between −10° and −45° is enhanced, reducing the visual difference. Furthermore, the luminance at angles below −45° and above +45° is reduced, minimizing unnecessary light emission and saving energy. Referring to FIG. 8, it shows the spatial luminance distribution in the oblique angle mode. It is noted that the spatial luminance distribution is a computer simulation and was originally in color but is presented in grayscale for this case. From the spatial luminance distribution in FIG. 8, it can be seen that in the side viewing mode, energy concentration is observable both at the center and on the left side. Additionally, when the height H of the central region 231 of each dot structure 23 is 5 μm, the power consumption for angle control is approximately 50% of that required when the height H of the central region 231 is 1 μm. This demonstrates an energy-saving effect and is advantageous for use in electric vehicle environments.

Additionally, the viewing mode switching method further includes a sensing step to determine whether to execute the side viewing mode or the narrow viewing mode based on vehicle speed or driver's eye gaze tracking. For example, if the sensing step detects that the vehicle speed is 0 or the primary driver does not need to maintain a forward gaze, the side viewing mode is executed, with both the upper backlight unit 2 and the lower backlight unit 3 turned on, allowing the primary driver to view the screen. If the vehicle speed is not 0 or the primary driver is gazing straight ahead, the narrow viewing mode is executed, with the upper backlight unit 2 turned off and the lower backlight unit 3 turned on, preventing the driver from clearly viewing the screen.

In summary, the backlight module and viewing mode switching method of the present invention provide the side viewing mode by simultaneously turning on both the upper backlight unit 2 and the lower backlight unit 3, while the narrow viewing mode is provided by turning on the lower backlight unit 3 and turning off the upper backlight unit 2. Therefore, the backlight module and display device of the present invention are capable of switching between the side viewing mode and the narrow viewing mode. Additionally, by positioning the upper light source 21, the light is directed towards the driver's seat and avoids reflection through the passenger side window. Additionally, with the increasing number of in-vehicle displays, there is a growing need for privacy protection. To avoid interfering with the driver's line of sight and to enhance driving safety, the present invention satisfies the narrow viewing mode (privacy protection) and the side viewing mode (shared viewing) by switching light sources on/off. This enables multi-functional use under different scenario conditions, particularly for in-vehicle displays. When applied to a display positioned in front of the passenger seat (Passenger Information Display, PID), the side viewing mode (shared viewing) allows both the driver and passengers to view the screen content simultaneously. In contrast, the narrow viewing mode (privacy protection) prevents the driver from seeing the display content, thereby reducing driver distraction and protecting passenger privacy. It also helps avoid reflections from the side windows that could affect the driver, ensuring driving safety. This solution meets the active switching needs for privacy and sharing modes of PID screens, and the light field in the sharing mode can be concentrated in specific areas, thereby improving light utilization efficiency.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, capable of switching between a side angle viewing mode and a narrow angle viewing mode, wherein in the side angle viewing mode, the backlight module has a first side angle luminance LAS1 and a first normal angle luminance LAN1, wherein LAS1/LAN1>50%, and in the narrow angle viewing mode, the backlight module has a second side angle luminance LAS2 and a second normal angle luminance LAN2, wherein LAS2/LAN2<0.5%, the first side angle and second side angle are in a slanting direction, and the first normal angle and second normal angle are in a normal direction;

wherein the backlight module comprises an upper backlight unit and a lower backlight unit located beneath the upper backlight unit, wherein the upper backlight unit comprises an upper light source and an upper light guide plate for receiving light emitted from the upper light source, the upper light guide plate having at least one first side edge and at least one second side edge, wherein the first side edge is substantially parallel to a first axis, the second side edge is substantially parallel to a second axis, and the second axis is non-parallel to the first axis, the first axis being between +90° and −90°, and the upper light source is positioned adjacent to one side of the first axis near +90° and extends along the second axis; and wherein the upper light guide plate comprises a light emitting surface, a reflective surface, and a plurality of dot structures formed on the reflective surface, the light emitting surface being on a plane defined by the intersection of the first axis and the second axis, the light emitting surface and the reflective surface being on opposite sides of the upper light guide plate, each dot structure comprising a central region and an outer ring region surrounding the central region, wherein the height H of the central region is greater than 1 μm, and the diameter ø of the outer ring region is greater than 2H.

2. The backlight module as claimed in claim 1, wherein the upper light guide plate is substantially rectangular, the first side edge being one of the longer sides of the rectangle, the second side edge being one of the shorter sides of the rectangle, and wherein the upper light source is adjacent to the shorter side.

3. The backlight module as claimed in claim 1, wherein the height H of the central region of each dot structure is between 3 μm and 7 μm, inclusive of endpoint values, and the diameter ø of the outer ring region is between 15 μm and 35 μm, inclusive of endpoint values.

4. The backlight module as claimed in claim 1, wherein the central region of each dot structure is concave relative to the reflective surface, and the outer ring region is annular and convex relative to the reflective surface.

5. The backlight module as claimed in claim 1, wherein the central region of each dot structure is protruding relative to the reflective surface, and the outer ring region is a recessed groove relative to the reflective surface.

6. The backlight module as claimed in claim 1, further comprising an upper light control film positioned on the light emitting side of the upper backlight unit, configured to collimate light emitted from the backlight module along the second axis to a normal viewing angle.

7. The backlight module as claimed in claim 6, further comprising at least one lower light control film positioned between the upper backlight unit and the lower backlight unit, wherein the upper light control film and the lower light control film control light in different directions, and the lower light control film is configured to collimate light emitted from the backlight module along the first axis to a normal viewing angle.

8. The backlight module as claimed in claim 1, wherein further comprising two prism sheets positioned between the upper backlight unit and the lower backlight unit, each prism sheet having a plurality of parallel stripe microstructures facing the upper backlight unit, wherein the extension directions of the stripe microstructures of the two prism sheets are perpendicular to each other.

9. The backlight module as claimed in claim 1, wherein the lower backlight unit comprises a lower light source, a lower light guide plate that receives light from the lower light source, and at least one optical film located on an emission side of the lower light guide plate, the lower light guide plate has an incident side connected to the emission side, the incident side receives light emitted from the lower light source, and the lower light source is arranged along the first axis.

10. The backlight module as claimed in claim 1, wherein the lower backlight unit comprises a lower light source, a diffuser plate that receives light from said lower light source, and at least one optical film located on an emission side of the diffuser plate, the diffuser plate has an incident side opposite to the emission side, and wherein the incident side receives light emitted from the lower light source.

11. The backlight module as claimed in claim 1, wherein the normal direction is substantially at 0° viewing angle position relative to the first axis, and the slanting direction is substantially at −45° viewing angle position relative to the first axis.

12. A viewing angle mode switching method of the backlight module as claimed in claim 1, comprising a side viewing angle execution step and a narrow viewing angle execution step, when executing the side viewing angle execution step, both the upper backlight unit and the lower backlight unit are turned on to switch to the side angle viewing mode, when executing the narrow viewing angle execution step, the upper backlight unit is turned off, and the lower backlight unit is turned on to switch to the narrow angle viewing mode.

13. The viewing angle mode switching method of the backlight module as claimed in claim 12, wherein the backlight module is applied to an in-vehicle display, the viewing mode switching method further comprising a sensing step to determine whether to execute the side viewing angle execution step or the narrow viewing angle execution step based on vehicle speed or driver's eye gaze tracking.

14. A display device, comprising the backlight module as described in claim 1, and a display panel arranged on the backlight module.

15. A backlight module, capable of switching between a side angle viewing mode and a narrow angle viewing mode, wherein in the side angle viewing mode, the backlight module has a first side angle luminance LAS1 and a first normal angle luminance LAN1, wherein LAS1/LAN1>50%, and in the narrow angle viewing mode, the backlight module has a second side angle luminance LAS2 and a second normal angle luminance LAN2, wherein LAS2/LAN2<0.5%, the first side angle and second side angle are in a slanting direction, and the first normal angle and second normal angle are in a normal direction;
wherein the backlight module comprises an upper backlight unit, a lower backlight unit located beneath the upper backlight unit, and two prism sheets positioned between the upper backlight unit and the lower backlight unit, wherein the upper backlight unit comprises an upper light source and an upper light guide plate for receiving light emitted from the upper light source, the upper light guide plate having at least one first side edge and at least one second side edge, wherein the first side edge is substantially parallel to a first axis, the second side edge is substantially parallel to a second axis, and the second axis is non-parallel to the first axis, the first axis being between +90° and −90°, and the upper light source is positioned adjacent to one side of the first axis near +90° and extends along the second axis; and
wherein each prism sheet has a plurality of parallel stripe microstructures facing the upper backlight unit, wherein the extension directions of the stripe microstructures of the two prism sheets are perpendicular to each other.

16. The backlight module as claimed in claim 15, further comprising an upper light control film positioned on the light emitting side of the upper backlight unit, configured to collimate light emitted from the backlight module along the second axis to a normal viewing angle.

17. The backlight module as claimed in claim 16, further comprising at least one lower light control film positioned between the upper backlight unit and the lower backlight unit, wherein the upper light control film and the lower light control film control light in different directions, and the lower light control film is configured to collimate light emitted from the backlight module along the first axis to a normal viewing angle.

18. A viewing angle mode switching method of the backlight module as claimed in claim 15, comprising a side viewing angle execution step and a narrow viewing angle execution step, when executing the side viewing angle execution step, both the upper backlight unit and the lower backlight unit are turned on to switch to the side angle viewing mode, when executing the narrow viewing angle execution step, the upper backlight unit is turned off, and the lower backlight unit is turned on to switch to the narrow angle viewing mode.

19. The viewing angle mode switching method of the backlight module as claimed in claim 18, wherein the backlight module is applied to an in-vehicle display, the viewing mode switching method further comprising a sensing step to determine whether to execute the side viewing angle execution step or the narrow viewing angle execution step based on vehicle speed or driver's eye gaze tracking.

20. A display device, comprising the backlight module as claimed in claim 15, and a display panel arranged on the backlight module.

* * * * *